R. SMITH.
Can-Opener.
No. 169,202. Patented Oct. 26, 1875.
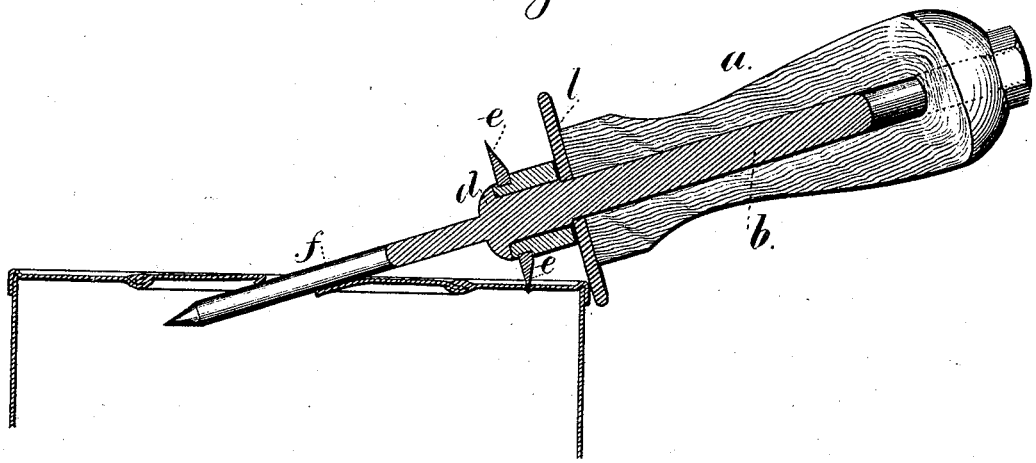
Fig. 1.
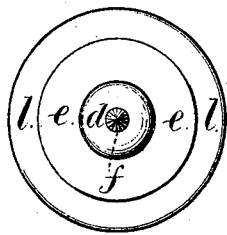
Fig. 2.
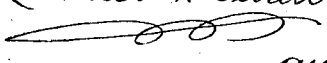

UNITED STATES PATENT OFFICE.

ROBERT SMITH, OF PATERSON, NEW JERSEY, ASSIGNOR TO HIMSELF AND CHARLES LITTLEFIELD, OF SAME PLACE.

IMPROVEMENT IN CAN-OPENERS.

Specification forming part of Letters Patent No. 169,202, dated October 26, 1875; application filed September 27, 1875.

*To all whom it may concern:*

Be it known that I, ROBERT SMITH, of Paterson, in the county of Passaic and State of New Jersey, have invented an Improvement in Can-Openers, of which the following is a specification:

Can-openers have been made of a rolling shear upon a bar, at the end of which is a bayonet-shaped spike to be thrust into the end of the can. In this the rolling shear is loose upon the rod, and is not guided in its cutting action, but may run nearer to or farther from the center.

My invention is made for regulating the action of the rolling shear or cutter. I connect such shear to the handle of the can-opener, so that it is kept in position, but is free to revolve, and I provide a gage to limit the approach of the cutter toward the center of the can, and I employ a pointed rod that is used to penetrate the metal, and form a fulcrum for the leverage employed in pressing the cutter into the metal.

In the drawing, Figure 1 is a section illustrating the construction of the cutter and its mode of use, and Fig. 2 is an end view of the implement.

The handle $a$ has a rod, $b$, running through it, and upon the same is the ferrule and collar $d$, forming the arbor upon which cutter $e$ revolves freely. The pointed rod $f$ extends out from the ferrule $d$ a convenient distance, and the length is less than the diameter of the can to be opened, so that said rod $f$ can be thrust through the end of the can, and then the cutter rolled upon the tin, as indicated, to cut through the same. The dish $l$ at the end of the handle serves as a gage to regulate the distance between the edge of the can and the incision cut by the rolling knife.

I claim as my invention—

The rolling knife $e$, confined to the handle by the ferrule $d$, in combination with gage $l$ and pointed rod $f$, as and for the purposes set forth.

Signed by me this 23d day of September, A. D. 1875.

R. SMITH.

Witnesses:
    GEO. T. PINCKNEY,
    CHAS. H. SMITH.